Sept. 30, 1969  E. H. BERRY ET AL  3,470,446
POSITIVE DC TO POSITIVE DC CONVERTER
Filed Jan. 12, 1968

EUGENE H. BERRY
FRANK J. NOLA
INVENTOR.(S)

BY

ATTORNEYS

United States Patent Office 3,470,446
Patented Sept. 30, 1969

3,470,446
POSITIVE DC TO POSITIVE DC CONVERTER
Eugene H. Berry, Arab, and Frank J. Nola, Huntsville, Ala., assignors to the United States of America as represented by the Administrator of the National Aeronautics and Space Administration
Filed Jan. 12, 1968, Ser. No. 697,341
Int. Cl. H02m 3/22, 5/40
U.S. Cl. 321—2
2 Claims

ABSTRACT OF THE DISCLOSURE

An apparatus for converting the output of a positive DC voltage source to a positive DC voltage of lower magnitude across a load having a common reference point with the source including a plurality of capacitors connected in series by first half wave rectifier means and in parallel by second half wave means. First and second transistor switch means extending between the positive output terminal of the DC source and a first load input terminal for alternately connecting one end of the capacitor circuit to the positive output terminal and to the first load input terminal and conducting means coupling the opposed end of the capacitor circuit to the negative terminal of the DC source and to the second load input terminal.

Origin of the invention

The invention described herein was made by employees of the United States Government and may be manufactured and used by or for the Government for governmental purposes without the payment of any royalties thereon or therefor.

Background of the invention

This invention relates generally to voltage conversion and more particularly to devices for converting a positive direct current voltage to a positive direct current voltage of lower amplitude.

In many applications, there exists a need for changing the magnitude of the output voltage of a positive direct current voltage source to obtain a secondary source of lower amplitude that is referenced to the same ground as the primary source. For example, in spacecraft vehicle installations it is generally necessary to step down the 28 volt direct current source usually installed therein to obtain a low level positive power supply to power operational amplifiers. Also, because of the common use of direct coupled circuitry in operational amplifiers, the common reference point between the positive DC source and the positive secondary source is required. The usual method is to use a DC to AC converter coupled to a transformer and a rectifier coupled to the output thereof to provide a direct current output. These devices are quite expensive, bulky and are usually very heavy, all of which limitations are of considerable importance, particularly in spacecraft vehicle installations.

Accordingly, one of the objects of this invention is to provide apparatus for changing the magnitude of a direct current voltage source without the use of transformers.

Another object of this invention is to obtain a secondary source of power wherein the secondary source has a common reference point to the primary source.

Summary of the invention

According to the present invention it has been found that a positive to positive DC converter can be made which has none of the aforementioned shortcomings by employing a plurality of capacitors that are adapted to be alternately charged by DC source while in series and discharged to a load having a common reference point with the DC source while in parallel. The use of a capacitance circuit is made possible by the novel technique of connecting the capacitors in series and in parallel by unidirectional conducting means so as to provide a common point that may be alternately connected to the positive terminal of the DC source and one input terminal of the load.

Description of the drawings

The invention both as to its organization and operation, together with further objects and advantages thereof may be best understood by reference to the following description taken in accordance with the accompanied drawings in which.

Description of the embodiments

Figure 1:
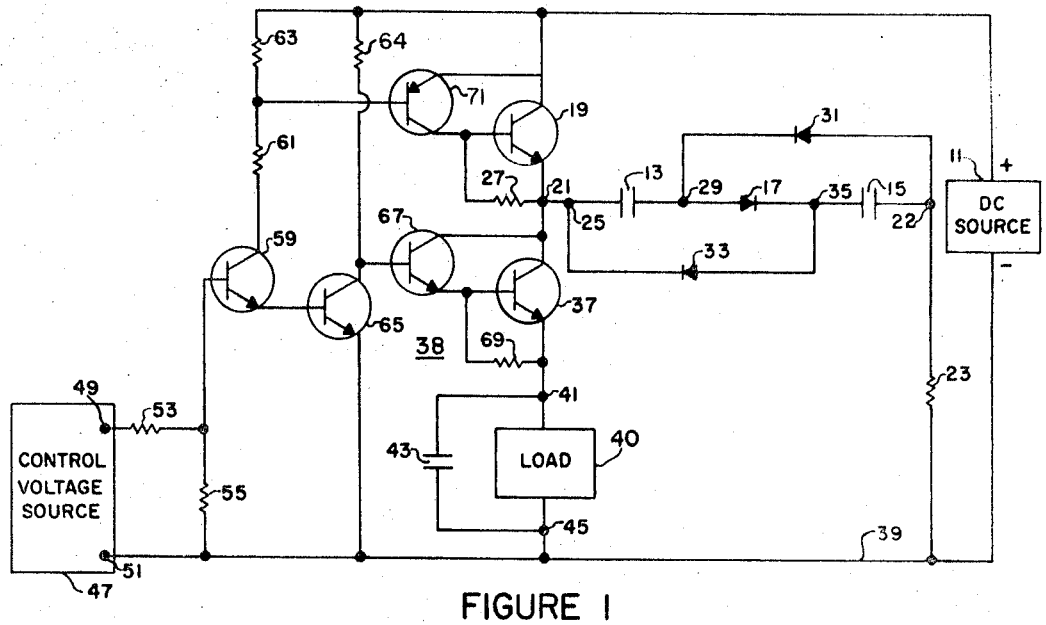
FIGURE 1 is a schematic representation of one embodiment of the invention.

In FIGURE 1 there is shown a source of direct current 11, the output voltage of which is to be converted to a lower magnitude. A pair of equal capacitance electrical capacitors 13 and 15 connected in series by half wave rectifier 17 are connected across the terminals of source 11 by means of NPN transistor switch 19 and current limiting resistor 23. The collector of transistor 19 is connected to the positive terminal source 11, the emitter of transistor 19 is connected to switching terminal 21 and the base of transistor 19 is connected to the switching terminal 21 by resistor 27. Terminal 25 of capacitor 13 is connected to the switching terminal 21 and terminal 22 of capacitor 15 is coupled to the negative terminal of DC source 11 by resistor 23 and lead 39.

To provide means for connecting capacitors 13 and 15 in parallel configuration with load 40, half wave rectifiers 31 and 33 and NPN transistor switch 37 are provided. Terminal 35 of capacitor 15 is connected to terminal 25 of capacitor 13 by rectifier 33 and terminal 22 of capacitor 15 is connected to terminal 29 of capacitor 13 by rectifier 31. Terminal 21 is connected to the collector of transistor 37, and the emitter of transistor 37 is connected to terminal 41 of load 39. A filter capacitor 43 is connected across the load terminals 41 and 45 and terminal 45 is connected to lead 39.

To control the conduction of transistor switches 19 and 37, a control circuit 38 is provided. The control circuit includes a reversible polarity control voltage source 47, such as a sine wave generator, the output voltage of which appears across output terminals 49 and 51 and is applied across the serial connection of resistors 53 and 55. The midpoint of resistors 53 and 55 is connected to the base of NPN transistor switch 59 while the collector of transistor 59 is connected to the positive terminal of the voltage source 11 via the serial connection of resistors 61 and 63 and the emitter of transistor 59 is connected to the base of NPN transistor switch 65. The emitter of transistor 65 is connected to lead 39 while its collector is connected to the positive terminal of the DC source by resistor 64.

The midpoint of resistors 61 and 63 is connected to the base of a PNP transistor switch 71 having its emitter connected to the collector of transistor 19 and its collector connected to the base of transistor 19. The collector of transistor 65 is connected to the base of a NPN transistor switch 67 having its collector connected to the collector of transistor 37 and its emitter connected to the base of transistor 37. Resistor 69 couples the emitter of transistor 67 to the emitter of transistor 37.

In a manner to be more fully explained hereinafter, transistor 19 and transistor 37 are operated in either the fully on or fully off condition, synchronized in a 180 degree phase relationship so that when transistor 19 is conducting, transistor 37 is non-conductive and when transistor 19 is non-conductive, transistor 37 is conductive. In operation, when transistor 19 is conducting and transistor 37 is non-conducting, terminal 21 will be effectively connected to the positive terminal of the voltage source so that capacitors 13 and 15 are connected in series with the source 11 through the collector-emitter path of transistor 19, terminal 21, capacitor 13, rectifier 17, capacitor 15 and current limiting resistor 23.

The capacitors 13 and 15 will thus be charged to substantially the output voltage of source 11 with the voltage across each capacitor equal to one-half the output voltage of the source 11. It will be understood that resistor 23 is provided to protect transistors 19 and 71 and rectifier 17 from a current in excess of their rated peak instantaneous current when capacitors 13 and 15 are initially connected across the source in an uncharged state.

When transistor 19 becomes non-conductive and transistor 37 becomes conductive terminal 26 will be disconnected from the positive terminal of the source 11 and will be simultaneously connected to the terminal 41 of load 39. Capacitor 13 will thus partially discharge through the collector-emitter paths of transistor 37, the load 40, lead 39, resistor 23 and rectifier 31 while capacitor 15 will partially discharge through rectifier 33, the collector-emitter paths of transistors 37 and 67, the load 40, lead 39 and resistor 23. Since the capacitors 13 and 15 are in parallel connection through rectifiers 31 and 33 while being discharged, the output voltage presented to the load is substantially one-half the voltage of the source 11.

So as to allow capacitor 43 to readily eliminate variations in the voltage across the load produced by the switching action described above, the switching of transistor 19 and transistor 37 is preferably at an extremely rapid rate. To accomplish this switching action, the conduction of transistors 19 and 37 are respectively controlled by transistors 71 and 67 which in turn are controlled by transistors 59 and 65.

In operation, on the portion of the positive half cycle of the control voltage source 51 that the potential appearing at the midpoint of resistors 53 and 55 exceeds the base to emitter drop of transistors 59 and 65, transistors 59 and 65 will be switched to their fully on state. The conduction of transistors 59 and 65 allows emitter base current to flow in transistor 71 thereby causing transistor 71 to switch to the fully on state. Simultaneously because of the conduction of transistor 65, the base of transistor 67 will be essentially at the potential of the negative terminal of the voltage source 11 and transistor 67 will accordingly be biased in a non-conductive state.

Transistors 19 and 37 are in the nature of follower stages of transistors 71 and 67 respectively to provide current amplification. It will be noted that the collector current of transistor 71 flows in the base junction of transistor 19 and the emitter current of transistor 67 flows in the base junction of transistor 37 so that the output current of transistors 19 and 37 is an amplified replica of the current flowing in transistors 71 and 69 respectively. Thus when transistor 71 is fully on and transistor 67 is fully off, transistor 19 will be switched to its fully on state while transistor 37 will be held in a non-conductive state.

When the output of the control voltage source 47 falls so that potential of the midpoint of resistors 53 and 55 is below the emitter-base drop of transistors 59 and 65, transistors 59 and 65 will be switched from fully on to fully off, thereby blocking current in the emitter-base path of transistor 71 and causing transistor 71 to be cut-off. Simultaneously, the non-conduction of transistor 65 causes the potential of the base of transistor 67 to become more positive than the emitter of transistor 67 and the transistor 67 will switch to a conductive state. Thus, with transistors 71 cut-off and transistor 67 fully on, transistor 19 will be switched to cut-off and transistor 37 will be switched to fully on thereby effectively disconnecting terminal 21 from the positive terminal of the DC voltage source and connecting terminal 21 to input terminal 41 of load 39.

Figure 2:
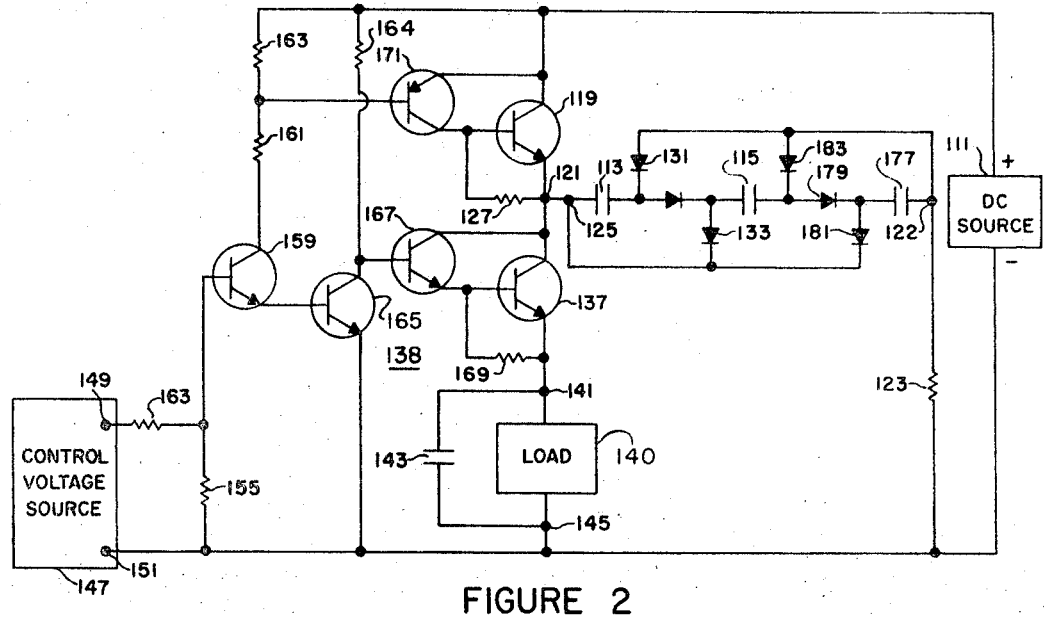
FIGURE 2 is a schematic representation of another embodiment of the invention showing how various ratios of inputs voltage to output voltage may be achieved.

Manifestly, the addition of additional sections of capacitors and half wave rectifiers will provide conversion ratios proportional to the number of sections added. For example, the embodiment shown in FIGURE 2 illustrates the manner of connection when it is desired to obtain a ratio different from 2:1, in this case the conversion ratio is 3:1. As shown in FIGURE 2, wherein reference numerals having the same last two digits designate identical component parts, an additional capacitor 177 is provided which is connected in series with capacitors 113 and 115 by half wave rectifier 179 and is connected in parallel with capacitors 113 and 115 by rectifiers 181 and 183.

The operation of this embodiment is the same as that of FIGURE 1, the capacitors 113, 115, and 161 being connected in series through rectifiers 117 and 163 when transistor 119 is conducting and transistor 137 is non-conducting and being discharged to the load 140 when transistor 137 is conducting and transistor 119 is non-conductive. A voltage conversion of 3:1 is effected in this manner since the voltage across each of the capacitors is one-third that of the total voltage across the capacitors when they are in series connection.

It will now be seen that the present invention provides very efficient means of converting a positive DC voltage to a positive DC voltage of lower amplitude wherein the secondary voltage is referenced to the same point as the primary voltage. Also it is seen that the conversion is accomplished without the use of transformers.

The invention is not to be restricted to the specific structural details, arrangement of parts, or circuit connections herein set forth, as various modifications therein may be affected without departing from the spirit and scope of this invention.

What is claimed is:

1. Apparatus for converting a positive direct current voltage to a positive direct current voltage of lower magnitude comprising:
   a direct current voltage source having positive and negative output terminals;
   a load having first and second input terminals;
   means connecting the second input terminal of said load to the negative output terminal of said source;
   a switching terminal;
   a plurality of capacitor means;
   first half wave rectifier means connecting said plurality of capacitor means in series between said switching terminal and said negative terminal;
   second half wave rectifier means connecting said plurality of capacitor means in parallel between said switching terminal and the second input terminal of said load; and
   means for effectively transferring said switching terminal back and forth between the positive output terminal of said source and the first input terminal of said load to charge said capacitor means through said first half wave rectifier means when the connection of said switching terminal is to the positive direct current output terminal and to discharge the capacitor means through said second half wave rectifier means when the connection of said switching terminal is to the first load terminal.

2. The apparatus of claim 1 wherein said last named means includes:
   a first transistor switch connecting said switching terminal to said positive direct current output terminal;
   a second transistor switch connecting said switching terminal to said first load input terminal; and
   control means for driving said first and second transistors alternately between cut-off and saturation in 180 degree phase relationship to one another.

References Cited

UNITED STATES PATENTS 2,802,171   8/1957   Minder ------------ 323—93 X

OTHER REFERENCES

Electronics, "DC Converter Circuit Uses Capacitors," Mar. 21, 1966, pp. 97, 98.

Scientific and Technical Aerospace Reports, "Capacitive Divider," May 8, 1965, issue No. 9, p. 1430.

JOHN F. COUCH, Primary Examiner

W. H. BEHA, JR., Assistant Examiner

U.S. Cl. X.R.

321—15; 323—93; 307—110